US00RE38246E

(19) United States
(12) Reissued Patent
Leonard et al.

(10) Patent Number: US RE38,246 E
(45) **Date of Reissued Patent: *Sep. 16, 2003**

(54) SEGMENTAL FACE MASK

(76) Inventors: Arnold S. Leonard, 5212 Colonial Dr., Golden Valley, MN (US) 55416; Joseph G. Bilek, 9888 Oakshore Dr., Lakeville, MN (US) 55044; James L. Kruse, 2830 Pine Rd., Mound, MN (US) 55364

( * ) Notice: This patent issued on a continued prosecution application filed under 37 CFR 1.53(d), and is subject to the twenty year patent term provisions of 35 U.S.C. 154(a)(2).

(21) Appl. No.: 09/304,948

(22) Filed: May 4, 1999

Related U.S. Patent Documents

Reissue of:
(64) Patent No.: 5,765,231
Issued: Jun. 16, 1998
Appl. No.: 08/812,538
Filed: Mar. 7, 1997

(51) Int. Cl.[7] ..... A42B 1/18
(52) U.S. Cl. ..... 2/206; 2/9; 128/857
(58) Field of Search ..... 2/9, 15, 206; 128/848, 128/857; 602/17, 46, 54, 74

(56) References Cited

U.S. PATENT DOCUMENTS 3,092,103 A * 6/1963 Mower ..... 2/15
3,878,563 A 4/1975 Pulju
4,674,133 A 6/1987 Oschner
4,773,409 A * 9/1988 Cilento et al. ..... 602/54
4,979,811 A * 12/1990 Boyer ..... 2/15
5,592,687 A 1/1997 Lajeunesse

* cited by examiner

*Primary Examiner*—Bibhu Mohanty
(74) *Attorney, Agent, or Firm*—Gregory F. Cotterell

(57) ABSTRACT

The present invention is a face mask suitable for application to a skin surface of a person's face, the face mask comprising [a plurality of facial mask segments] *at least one facial mask segment* of resilient polymeric foam, each segment conformable to at least a portion of the surface of the person's face and including a first surface, a second surface and a shaped peripheral margin, an adhesive attachment, suitable for use on the first surface of each segment and suitable for attaching the segment to the person's skin; and a decoration, suitable for application on the second surface of each segment, for decorating the face mask; wherein the [plurality of facial mask segments cover substantially all] *at least one facial mask segment covers at least a portion* of the surface of the skin of the person's face.

42 Claims, 3 Drawing Sheets

SEGMENTAL FACE MASK

Matter enclosed in heavy brackets [ ] appears in the original patent but forms no part of this reissue specification; matter printed in italics indicates the additions made by reissue.

FIELD OF THE INVENTION

The present invention is related to face masks, and in particular, to a face mask having multiple segments adhesively attachable to the skin of a person's face.

BACKGROUND OF THE INVENTION

Decorating one's face by applying paint, make-up or a mask is well known to the young and old alike. As examples, every October 31, a significant number of children dress up with costume and hide behind a disguise to go about their neighborhoods from door-to-door trick-or-treating. Adults participate in masquerade balls with lesser or greater involvement, but almost always involving some sort of a disguise, usually in the form of a mask.

The style of disguise and method for achieving the disguise are almost as varied as the number of people that put on a disguise or decorate their faces. Some methods, probably as old as the history of man, use paints in the form of colorful pigments suspended in some suitable base that are then spread about the surface of the person's face to create the disguise, or the chosen effect. This form of painting one's face is as common, and yet sophisticated and as subtle, as the application of facial make-up, a method used by many people on a daily basis.

The application of pigments directly to the person's face must also eventually involve the process of removing the pigments. This process can be time consuming and messy on a routine basis. However, despite the mess and tedium, this method of decorating one's face is still preferred by many that use minimal amounts of make-up or pigment.

Traditional masks are useful if a person wishes to decorate or disguise their face, and yet avoid the messiness of applying paints and pigments directly to their face. Masks have the unfortunate difficulty of oftentimes being cumbersome and difficult to manage, especially for the younger child. The mask frequently interferes with the wearer's vision, usually because of the distance the mask must be offset from the wearer's face creating a tunnel vision effect. Another difficulty encountered, particularly with a full face mask, is interference with breathing, either from obstruction or, more subtly, from poor air exchange by inadvertently trapping air behind the mask and forcing the wearer to frequently rebreathe their exhaled breath. Depending on the size of the mask, the mask might interfere with motion of the head or become uncomfortable to wear because of a build up of heat that may cause sweating or other unwanted conditions.

In more recent times, decals have been developed whereby a decoration is applied to the surface of a small piece of extremely thin and flimsy plastic film. These decals are small because of the difficulty encountered in handling the plastic film. The film has a tendency to fold over on itself and render the decal useless. Consequently, only a very small surface area of skin is covered by a decal. The decals have also proven to be difficult to remove at times because of the thinness of the film. Not coming off directly, but rather through the natural turnover of the skin as the skin stuffs over time. These decals may be quite unsightly over time while they slowly disintegrate.

There is a need for a facial decorating or disguising mask that is easy to apply, will cover as much or as little of the face as is desired, is easily removed, which is non-irritating and not messy, and does not interfere with natural vision, breathing, or motion of the head or face.

SUMMARY OF THE INVENTION

The present invention is a face mask suitable for application to a skin surface of a person's face, the face mask comprising a plurality of facial mask segments of resilient polymeric foam, each segment conformable to at least a portion of the surface of the person's face and including a first surface, a second surface and a shaped peripheral margin, an attachment means, suitable for use on the first surface of each segment and suitable for attaching the segment to the person's skin; and decoration means, suitable for application on the second surface of each segment, for decorating the face mask; wherein the plurality of facial mask segments cover substantially all of the surface of the skin of the person's face.

The present invention anticipates that the second surface is suitable for receiving a decoration onto the surface. The segments are shaped so as to fit over and conform to a portion of the person's face, and thus, segmentally cover substantially all of the face, thereby giving the effect of having a complete mask on the face. The present invention anticipates that the mask segments may be decorated at the time of manufacture with many different decorations by either directly printing or painting the decoration onto the segment second surfaces. Another method is to apply the decoration using a set of decorated decal segments shaped to conform to the segment shapes of the present invention mask and applying the appropriate decal segment to its appropriate mask segment.

Alternatively, the present invention anticipates that a wearer may wish to have the opportunity of creating their own decoration. As a consequence, the mask of the present invention may have a blank surface suitable for providing a surface for the wearer to apply their own paint, ink or other pigmented make-up to. Additionally, the present invention anticipates that the second surface also may be textured or have a three dimensional contour across its surface that contributes to, or enhances, the decoration applied to the second surface of the mask segment.

The present invention also anticipates the use of accessory segments that are suitably attachable onto the second surface of a mask segment. The accessory segment may be used to augment the main decoration or alter or change the primary decoration of the main mask segment to which the accessory is applied.

An object of the present invention is to provide a facial mask that is easy to apply having sufficient bulk or thickness so as to not easily fold back on itself. Yet each mask segment is resilient so as to easily shape and conform itself to the surface contour of the portion of face it is to cover.

Another object of the present invention is to provide a mask that covers as much or as little of the face as is desired. The present invention anticipates that the wearer may wish to trim down any, or all, of the various mask segments so as to tailer the invention to shape and fit the individual wearer's face. So as to not lose the decoration by trimming a mask segment down to fit a small child, the present invention anticipates the need to provide several general sizes for groups of variously sized faces minimizing, or eliminating, the need for any actual trimming or shaping.

A further object of the present invention is to provide a segmented mask that is easily removed. The polymer foam has a sufficient strength so as to not rip or tear leaving small sections on the person's face. Additionally, the present invention uses attachment means suitable for use on the skin of a person's face. The adhesive is non-irritating and hypo-allergenic to the skin and sufficiently strong to hold a mask segment, yet come away with little effort when peeling the segment off.

Another further object of the present invention is to provide a segmented mask that is not messy to use or remove. By applying the decoration directly to the second surface of each mask segment, the wearer avoids the mess of having make-up or similar pigments or paints applied directly to the skin. The wearer also avoids the unsightly remnants of a decal that is only partially removable.

An additional further object of the present invention is to provide a segmented facial mask that does not interfere with natural vision, breathing, or motion of the head or face. The present invention anticipates the use of polymeric foam sufficiently thin so as to not cause any physical impairment to the wearer.

BRIEF DESCRIPTION OF THE DRAWINGS

These and other objects and advantages of the present invention will be clearly described in reference to the drawings where throughout the several views, identical reference characters represent similar or equivalent structures wherein.

DETAILED DESCRIPTION OF THE INVENTION

Figure 1:
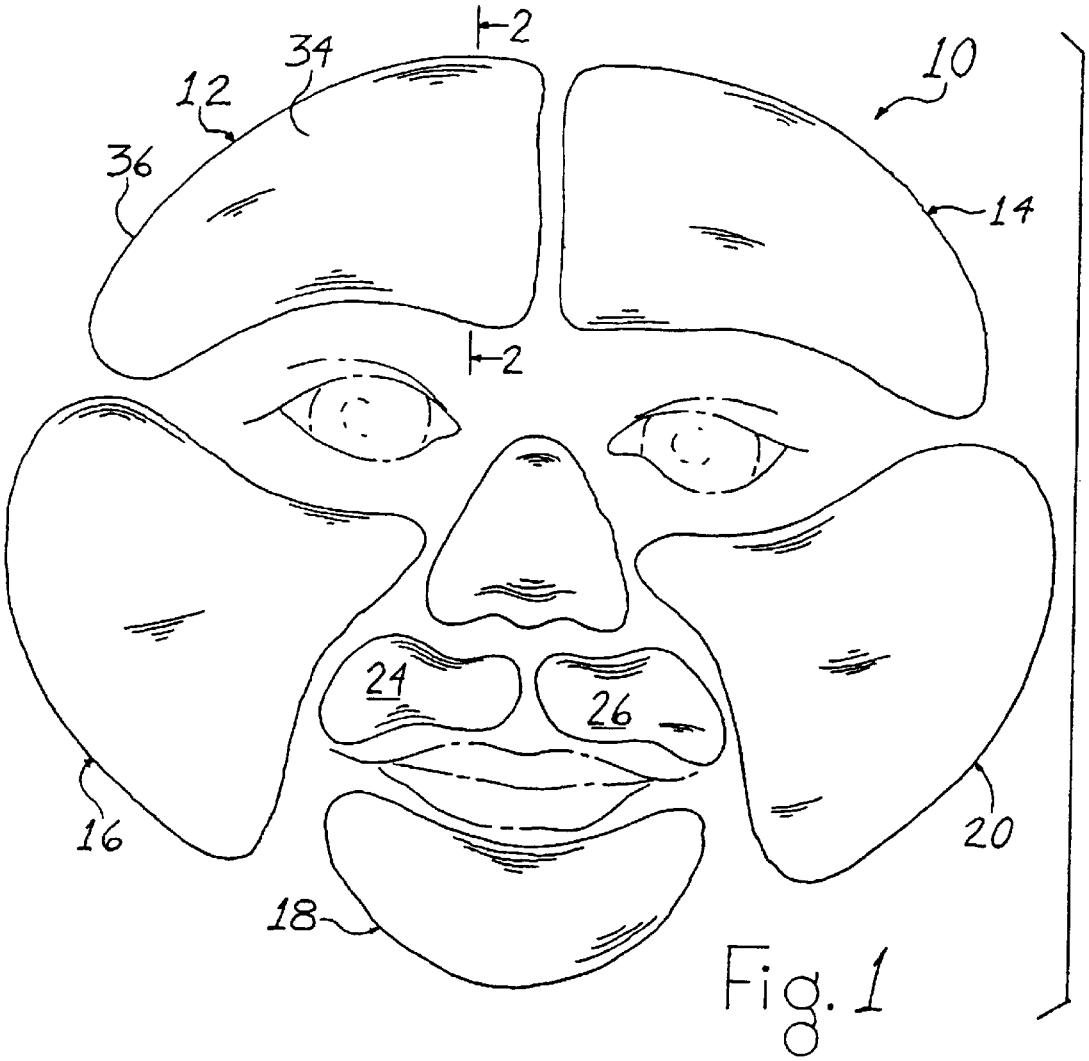
FIG. 1 is a front elevational view of an embodiment of the present invention shown in relation to a person's eyes and mouth drawn in phantom.
Figure 2:
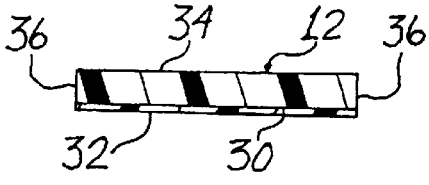
FIG. 2 is a cross-sectional view of a single mask segment taken at line 2—2 of FIG. 1.

In reference to FIGS. 1 and 2, there is depicted a segmented facial mask 10 as a preferred embodiment of the present invention comprising a plurality of mask segments as a right forehead segment 12, a left forehead segment 14, a right malar segment 16, a mental segment 18, a left malar segment 20, a nasal segment 22, a right upper lip segment 24 and a left upper lip segment 26 shown in a spatial reference to a person's eyes and mouth drawn in phantom. Each mask segment 12–26 has several features common to each segment, a first surface 30 suitable for bearing an attachment means 32, seen in FIG. 2, but in FIG. 1 is that surface of each segment turned away from the viewer, an upper or second surface 34, and a shaped peripheral margin 36.

Each mask segment 12–26 is preferably made from a pliable and resilient polymeric foam, such as a poly-vinyl-chloride foam sold under the name Microfoam by 3M, St. Paul, Minn. Other suitable polymers are readily apparent to those skilled in the art as those polymeric foams that exhibit minimal to no skin reaction. These polymeric foams are also identifiable as hypo-allergenic and are often used in medical applications. Examples of other polymeric foams suitable for use in the present invention are those derived from polymers such as polyurethane, polypropylene, polyester, polyethylene and polystyrene.

The polymeric foam may be either open cell or closed cell in its construction. Preferably the polymeric foam is of a closed cell construction throughout. However, an open cell construction with a closed cell "skin" is also acceptable. Each mask segment 12–26 has second surface 34 that is suitable to receive a decoration. Depending on the means of decoration, surface 34 may be expected to receive paints, inks, and other dyes suitable for use on devices to be worn on a human. Preferably, such paints, inks, and dyes are also hypo-allergenic and non-toxic. By choosing the appropriate polymeric foam, surface 34 can be chosen that best accepts the types of paints, inks and dyes used. Different polymeric foams will exhibit differences in lubrisity, hydrophilia, hydrophobia and ionic moieties available for good acceptance of the chosen decoration onto surface 34.

Alternatively, a polymeric foam may be selected so as to have a surface suitable for receiving a decal decoration comprised of a decorative design carried on a flimsy thin film that is then layered onto surface 34. Another aspect of surface 34 is that it need not always be flat, but may be textured or contoured so as to enhance any given design or decoration applied to surface 34.

In this preferred embodiment the number of mask segments is eight. These number of segments has been found to provide good coverage of the face in conjunction with adaptability to many different facial sizes and contours also remain comfortable. Other numbers of segments are contemplated, with a range of from five to ten segments being preferable. As an example, different segments may be formed that will cover different regions or areas of the face. Right and left forehead segments 12, 14 may be formed as a single pan-forehead segment. Right and left malar segments 16, 20 may be combined with nasal segment 22 as a single piece. Many different combinations and numbers of segments may be used to provide for a versatile application of the present invention to accommodate many different decorations and designs to many different faces. Differing the numbers of segments is an advantage of the present invention because the segments are able to act independently of each other. Even though a segment may mask that respective portion of the person's face, the person may enhance the visual experience of the mask by moving various facial muscles which move the various segments. Thus, a segment may be caused to move independently form another adding more expression to the effect of the facial mask.

The versatility of the present invention in forming different segments is accomplished by using sheets of polymeric foam material. The sheets may then be passed through a machine capable of cutting the sheeting into the appropriate shapes. This system is much like a collection of "cookie" cutters, each cutting dye shaped to produce its corresponding segment. If appropriately backed, the polymeric foam may be passed through the machine as a long web. Appropriate backing may be chosen that incorporates attachment means 32, such as a thin layer of pressure sensitive adhesive combined with a removable release liner. The segments may be cut through and through by the cutting dyes, but the cutting is set up so as to only cut the polymeric foam and not the release liner. The release liner then doubles as a backing layer upon which to carry the various mask segments and from which each segment is then peeled just prior to attachment to the person's face. One such pressure sensitive adhesive is an iso-octo-acrylate and acrylic acid adhesive, also available from 3M. Adhesives are preferably chosen for their non-irritating, hypo-allergenic and non-toxic characteristics and a number of such pressure sensitive adhesives for use on a person's skin are well known in the art.

Other attachment means will become obvious to those skilled in the art of applying decorations and make-up to skin. Examples of other attachment means are spirit gum and related liquid adhesives that may be brushed on just prior to application of the mask segments.

Another advantage of the present invention is the ability to contour the polymeric foam of mask segments 12–26. Each mask segment 12–26 is manufactured with a specific shape to shaped peripheral margin 36, corresponding to its intended position on the person's face, and this shape is modifiable depending on the number of segments to be manufactured. The present invention also anticipates the usefulness of further modification of each mask segment at the time of application of the mask to the person's face.

Figure 3:
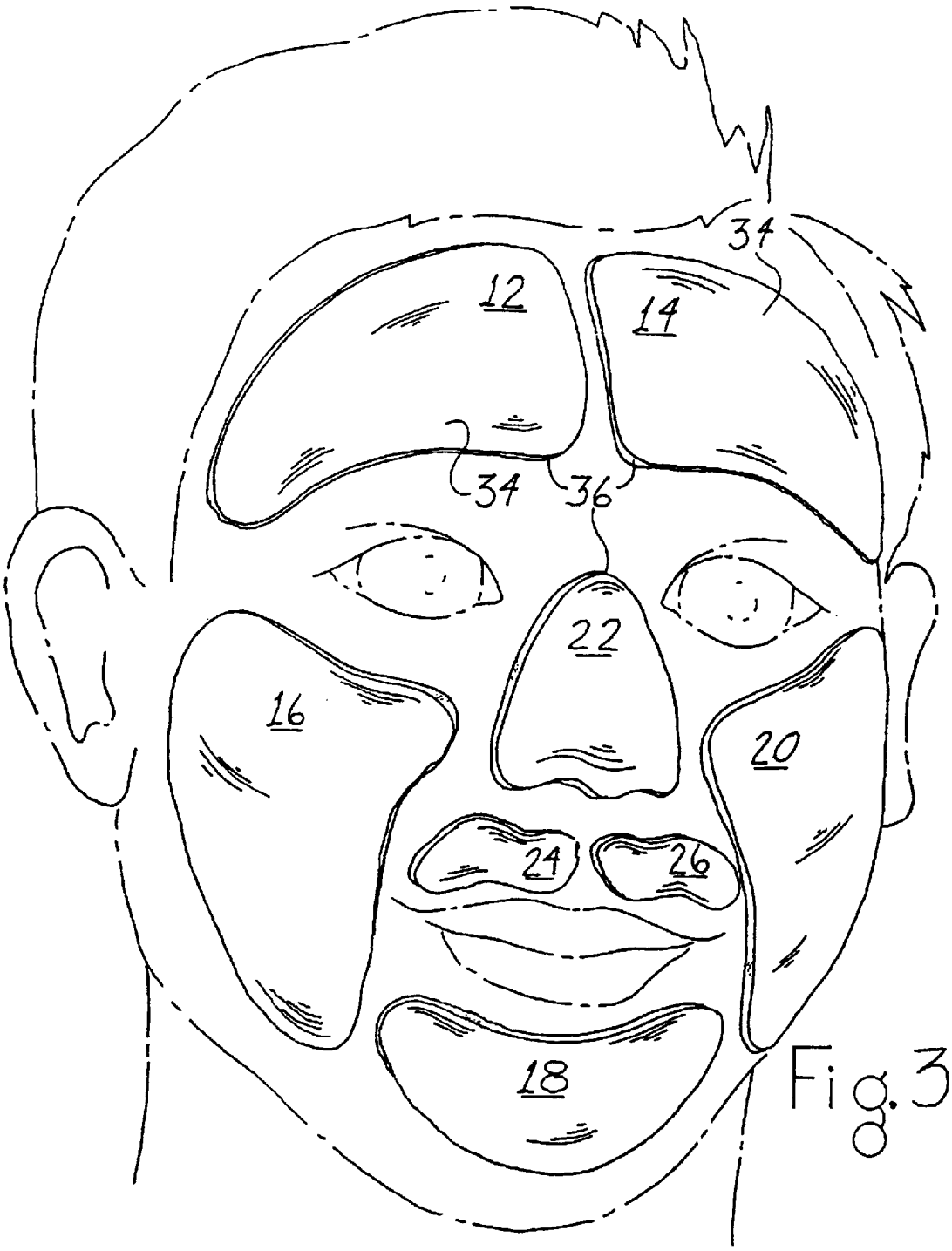
FIG. 3 is a perspective view of the embodiment shown in FIG. 1, further showing the relationship of the present invention to a person drawing in phantom.
Figure 4:
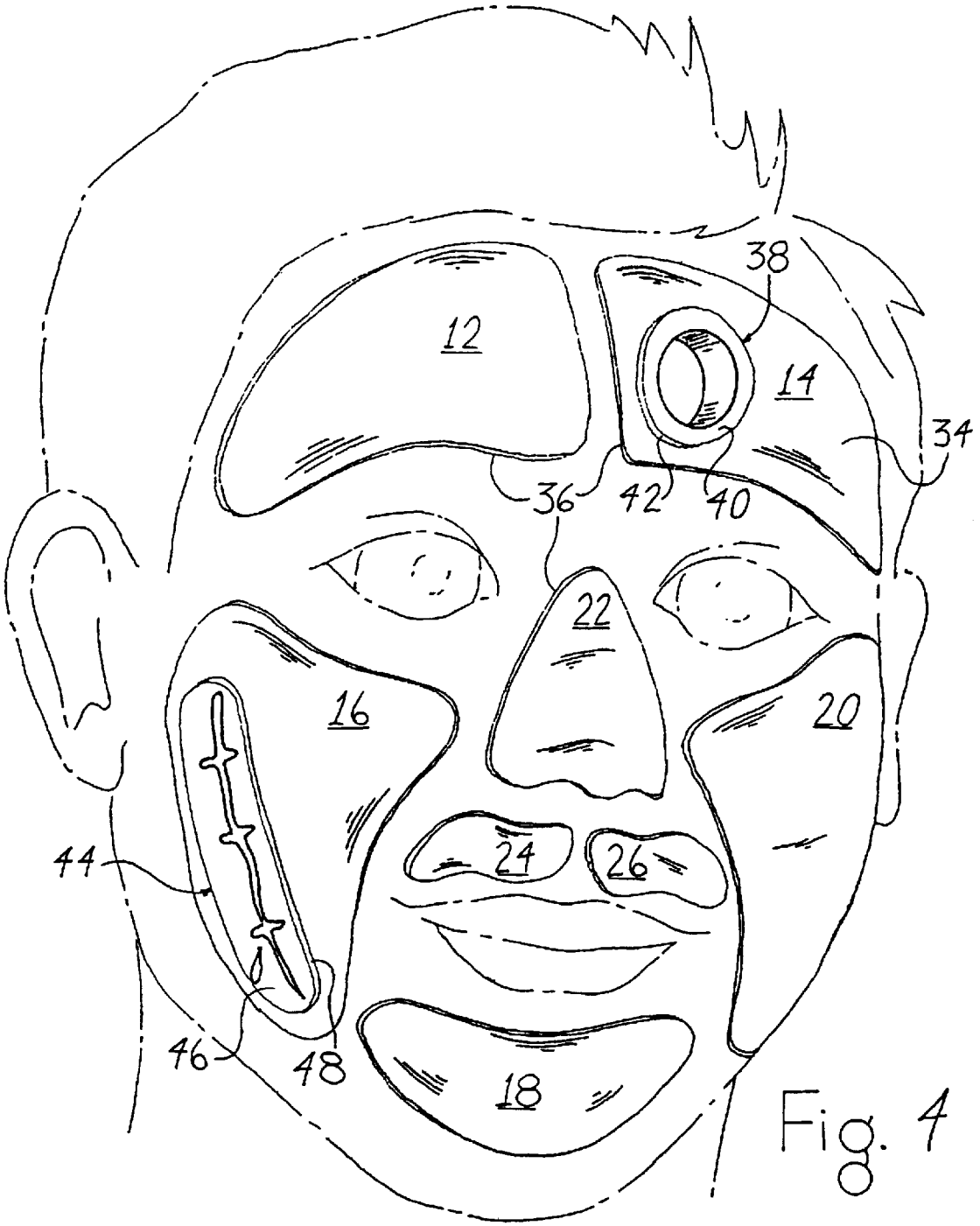
FIG. 4 is a perspective view of another embodiment of the present invention similar to the embodiment of FIG. 1 with the addition of accessory segments.

In operation, as depicted in FIGS. 3 and 4, a segmental mask according to the present invention has been applied to the face so as to substantially cover the person's face. Each mask segment 12–26 is flexible and resilient so as to conform to the surface contours of the person's face without interfering with vision, breathing or motion of the face or head.

In FIG. 4, there is depicted the application of an accessory segment 38 having a decorative surface 40 and a peripheral margin 42, and an accessory segment 44 with a decorative surface 46 and a peripheral margin 48. Each accessory segment 38, 44 has been attached by an attachment means on a surface opposite decorative surfaces 40, 46 and between accessory segments 38, 44 and their respective mask segments 14, 16. A representative decoration is depicted on each accessory segment 38, 44 so as to provide an example of one way in which an accessory segment may enhance and augment a segmental mask of the present invention.

While the invention has been illustrated by means of specific embodiments and examples of use, it will be evident to those skilled in the art that many variations and modifications may be made therein without deviating from the scope and spirit of the invention. However, it is to be understood that the scope of the present invention is to be limited only by the appended claims.

We claim:

1. A face mask suitable for application to a person's face skin surface, the face mask comprising:

a plurality of facial mask segments of resilient polymeric foam, each segment conformable to at least a portion of the surface of a person's face and including a first surface, a second surface and a shaped peripheral margin;

[an] attachment means, on the first surface of each segment, suitable for attaching the segment to a person's skin; and decoration means, on the second surface of each segment, for decorating the face mask;

wherein the plurality of facial mask segments are designed to cover substantially all of the skin of a person's face.

2. The face mask of claim 1 in which the polymeric foam includes a closed cell foam.

3. The face mask of claim 1 in which the polymeric foam second surface includes a closed cell skin surface.

4. The face mask of claim 1 in which the polymeric foam includes a polymer chosen from a group of polymers consisting of: polyurethane; polyethylene; polypropylene; polyester; poly-vinyl-chloride; and polystyrene.

5. The face mask of claim 1 in which the attachment means includes a pressure sensitive adhesive layer suitable for use on a person's skin surface and a suitable release liner over the pressure sensitive adhesive, removable just prior to attaching the segment to the person's skin.

6. The face mask of claim 1 in which the attachment means includes a liquid adhesive suitable for use on a person's skin that is applicable between the first surface and [a] *the* person's skin just prior to attaching the segment to [a] *the* person's skin.

7. The face mask of claim 1 in which the decoration means includes at least one painted design on the second surface.

8. The face mask of claim 1 in which the decoration means includes at least one inked design on the second surface.

9. The face mask of claim 1 in which the decoration means includes a design bearing decal sufficient to cover at least a portion of one of the second surfaces of the plurality of mask segments.

10. The face mask of claim 1 further comprising an accessory segment of polymeric foam having attachment means suitable for attachment of the accessory segment to a selectable area of the second surface of at least one facial mask segment of the plurality of facial mask segments.

11. The face mask of claim 10 in which the accessory segment attachment means includes a pressure sensitive adhesive and a removable release liner.

12. The face mask of claim 10 in which the accessory segment further comprises decoration means suitable for decorating a surface of the accessory segment.

13. The face mask of claim 12 in which the decoration means includes at least one paint suitable for decorating the surface of the accessory segment.

14. The face mask of claim 12 in which the decoration means includes at least one ink suitable for decorating the surface of the accessory segment.

15. The face mask of claim 12 in which the decoration means includes at least one decal suitable for attaching to and decorating the surface of the accessory segment.

16. The face mask of claim 1 in which the plurality of segments includes at least five segments.

17. The face mask of claim 1 in which the plurality of segments is preferably eight segments.

*18. A face mask suitable for application to a person's face skin surface, the face mask comprising:*

*at least one facial mask segment of resilient polymeric foam, the at least one segment conformable to at least a portion of the surface of a person's face and including a first surface, a second surface and a shaped peripheral margin;*

*a liquid adhesive attachment for use on a person's skin that is applicable between the first surface and a person's skin just prior to attaching the at least one segment to a person's skin, and*

*decoration means, for application on the second surface of the at least one segment and decorating the face mask;*

*wherein the at least one facial mask segment covers at least a portion of the skin of a person's face.*

*19. The face mask of claim 18 in which the polymeric foam includes a closed cell foam.*

*20. The face mask of claim 18 in which the polymeric foam second surface includes a closed cell skin surface.*

*21. The face mask of claim 18 in which the polymeric foam includes a polymer chosen from a group of polymers consisting of: polyurethane; polyethylene; polypropylene; polyester; poly-vinyl-chloride; and polystyrene.*

*22. The face mask of claim 18 in which the decoration means includes at least one painted design on the second surface.*

*23. The face mask of claim 18 in which the decoration means includes at least one inked design on the second surface.*

*24. The face mask of claim 18 in which the decoration means includes a design bearing decal sufficient to cover at least a portion of the second surface of the at least one facial mask segment.*

*25. The face mask of claim 18 further comprising an accessory segment of resilient polymer having attachment means suitable for attachment of the accessory segment to a selected area of the second surface of the plurality of facial mask segments.*

*26. The face mask of claim 25 in which the accessory segment attachment means includes a pressure sensitive adhesive and a removable release liner.*

*27. The face mask of claim 25 in which the accessory segment further comprises decoration means suitable for decorating a surface of the accessory segment.*

*28. The face mask of claim 27 in which the decoration means includes at least one paint suitable for decorating the surface of the accessory segment.*

*29. The face mask of claim 27 in which the decoration means includes at least one ink suitable for decorating the surface of the accessory segment.*

*30. The face mask of claim 27 in which the decoration means includes at least one decal suitable for attaching to and decorating the surface of the accessory segment.*

*31. A face mask suitable for application to a person's face skin surface, the face mask comprising:*

*at least one facial mask segment of resilient polymeric foam, the at least one segment conformable to at least a portion of the surface of a person's face and including a first surface, a second surface and a shaped peripheral margin;*

*attachment means, for use on the first surface of each segment and attaching the segment to the person's skin;*

*decoration means, for application on the second surface of the at least one segment and decorating the face mask; and*

*an accessory segment of resilient polymeric foam having attachment means suitable for attachment of the accessory segment to a selected area of the second surface of the plurality of the at least one segment;*

*wherein the at least one facial mask segment covers at least a portion of the skin of the person's face.*

*32. The face mask of claim 31 in which the polymeric foam includes a closed cell foam.*

*33. The face mask of claim 31 in which the polymeric foam second surface includes a closed cell skin surface.*

*34. The face mask of claim 31 in which the polymeric foam includes a polymer chosen from a group of polymers consisting of: polyurethane; polyethylene; polypropylene; polyester; poly-vinyl-chloride; and polystyrene.*

*35. The face mask of claim 31 in which the decoration means includes at least one painted design on the second surface.*

*36. The face mask of claim 31 in which the decoration means includes at least one inked design on the second surface.*

*37. The face mask of claim 31 in which the decoration means includes a design bearing decal sufficient to cover at least a portion of the second surface of the at least on facial mask segment.*

*38. The face mask of claim 31 in which the accessory segment attachment means includes a pressure sensitive adhesive and a removable release liner.*

*39. The face mask of claim 38 in which the accessory segment further comprises decoration means suitable for decorating a surface of the accessory segment.*

*40. The face mask of claim 39 in which the decoration means includes at least one paint suitable for decorating the surface of the accessory segment.*

*41. The face mask of claim 39 in which the decoration means includes at least one ink suitable for decorating the surface of the accessory segment.*

*42. The face mask of claim 39 in which the decoration means includes at least one decal suitable for attaching to and decorating the surface of the accessory segment.*

* * * * *